United States Patent Office 2,786,193
Patented Mar. 19, 1957

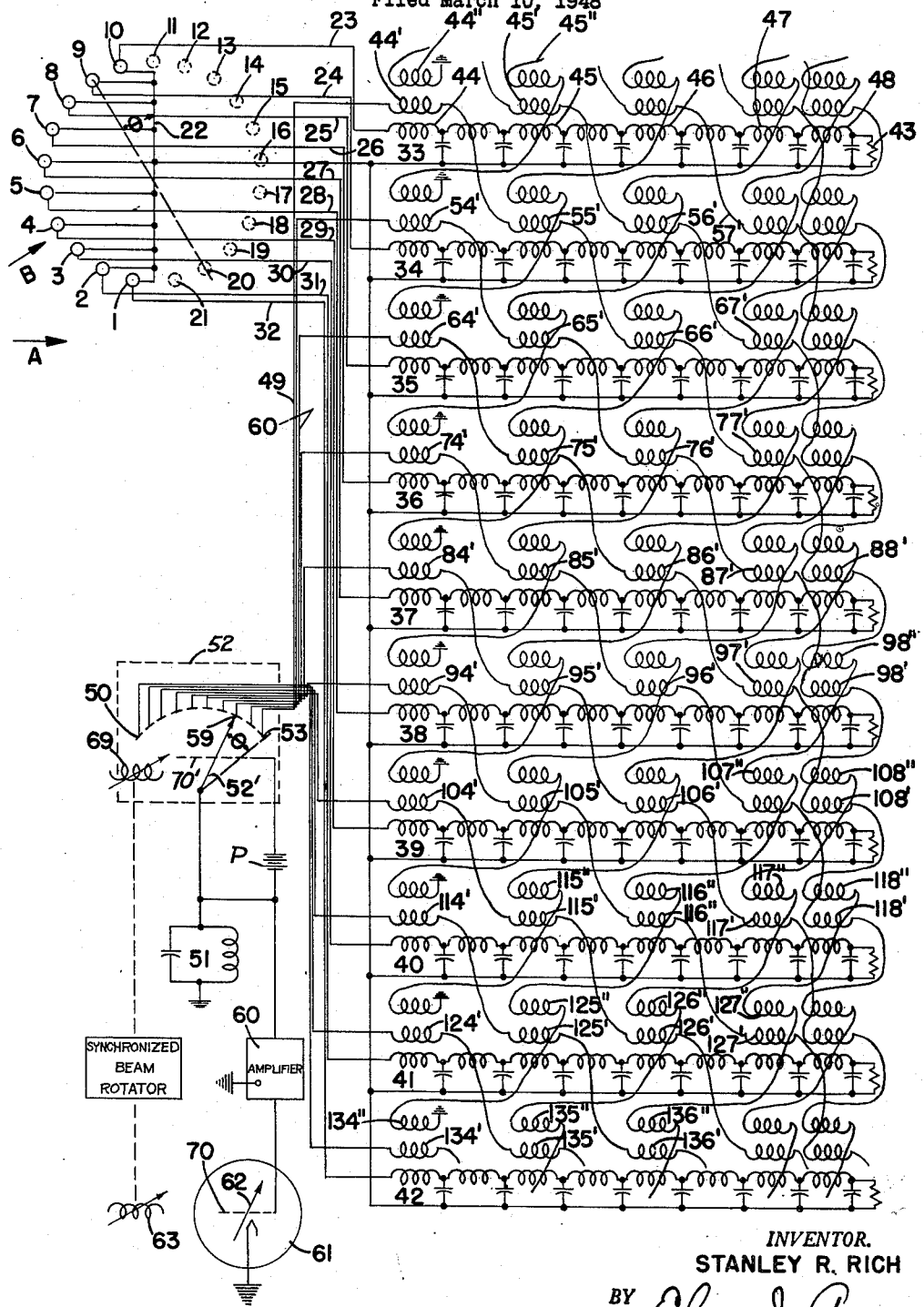

2,786,193

UNDERWATER SOUND SYSTEM

Stanley R. Rich, Newton Center, Mass., assignor to Raytheon Manufacturing Company, a corporation of Delaware Application March 10, 1948, Serial No. 14,017

15 Claims. (Cl. 340—6)

This invention relates to an electronic scanning system particularly applicable for use in echo ranging and direction finding in which scanning may be accomplished for a complete 360° azimuth circle or for sectors of less angular magnitude rapidly and without the use of rotating wave transducers.

The present scanning system involves the use of a plurality of fixed wave transducers or the like which, in a 360° scanning system, are arranged uniformly about a circle or other symmetrical figure in the plane in which scanning or transmission is to be accomplished in cooperation with a plurality of electrical delay lines in an arrangement which, as will appear herein, is aptly termed a "lens network," and is characterized by low energy loss and correspondingly high efficiency. Each transducer is permanently connected to one end of an electrical delay line upon which the signals are impressed and the delay lines are each preferably terminated in its characteristic impedance. In accordance with the further development of the present system, there is also coupled by transformer action to the delay line inductors a plurality of groups of coils in the nature of secondary windings of which the coils in each group are connected in series, all the groups terminating in a selector switch mechanism by means of which the groups are selectively connected in turn to a power source or an output circuit for selecting the desired directivity of the array of transducers as a whole.

The invention operates in accordance with the maximum intensity principle whereby, for example, the impulses received in each transducer are compensated to bring them into approximately the same phase for a desired directivity whereby a maximum intensity effect is obtained and observed in one direction and a minimum at all others. The indication, for received signals, may be produced visually by means of a cathode ray oscilloscope with a rotating beam upon which the indication is impressed to produce the desired effect. The beam may be suppressed until a signal is received to cause the beam to produce a spot on the face of the oscilloscope tube, or electrostatic deviation plates or electromagnetic coils may be used for producing a deflection of the beam trace.

As a selector switch mechanism the present invention preferably employs an electronic commutator switch tube such as that which is described in the copending application Serial No. 655,447, filed March 19, 1946, now Patent No. 2,684,449.

The present invention will be more fully described in the specification set forth below, taken in connection with the drawing illustrating an embodiment of the same, showing a schematic diagram of a system in accordance therewith.

In the figure the wire is shown only for a portion of the whole number of transducers, it being understood that the same scheme is followed through for the entire array. This method of illustration has been employed for the purpose of simplicity and to maintain at a minimum the number of drawings, more of which, it is believed, would not materially add to the understanding of the invention.

The transducers 1 to 21, inclusive, may each be a sonic or supersonic receiver, for example, for underwater use, in which case they are positioned in the external water or in a sea chest within a vessel, but accessible acoustically to the surrounding medium. The transducers maintain their respective spacings as indicated in the drawing; that is, they are uniformly spaced apart about a circumference in a plane. Since only a portion of the phasing system is shown, transducers 11 to 21, inclusive, are shown in dotted lines. All of the transducers have, preferably, a common ground 22 for one terminal connection while the other terminal of each unit is connected via one of wires 23 to 32, inclusive, to an end of one of the delay lines 33 to 42, respectively. The signals received by the transducers and transmitted to the respective delay lines travel down to the ends of the lines, which are each terminated with a proper impedance 43 by means of which no reflections are produced. Each delay line comprises a well-known arrangement of series connected inductances. Selected ones of the inductances of each line, as, for instance, 44, 45, 46, 47 and 48 of line 33, are each coupled, transformer fashion, and preferably tightly, to two secondary windings 44' and 44", 45' and 45", etc., by means of which the signals from each transducer are picked off the line or acquired and combined in substantially the same phase in a single signal pickup circuit for each desired directivity of the array of transducers.

Thus, for example, one signal pickup circuit comprises in series connection the following secondary windings: coil 44' in line 33; coil 55' in line 34; coil 66' in line 35; coil 77' in line 36; and coil 88' in line 37. With this arrangement the received impulses in the individual transducers 10, 9, 8, 7 and 6 are successively retarded in time by amounts corresponding, respectively, to the electric delay distance from the beginning of each of the respective thereto connected delay lines to the point therein where the pickoff secondary winding 44', 55', 66', 77' or 88' is situated. This is a condition for reception, with maximum intensity, of a sound approaching substantially in the direction of the arrow A since the sound wave will arrive at the forward transducers 6 and 5 earlier than at the other transducers 7, 8, 9, 10, 12, 3 and 4, and therefore the delay will necessarily be progressively less for the other transducers than for the forward transducers 6 and 5, in the line of reception of the sound waves.

It should be noted that the amount of compensation with respect to amplitude in this arrangement of transducers is not equal between all transducer units, the desired amplitude compensation or contribution being proportional approximately to a sine or cosine function. For this reason, if a sound wave is approaching from the direction of the arrow A, the compensation between the successive units 8, 9 and 10, for example, will necessarily have to be progressively greater than that between the more forward units 6 and 7. The values of time delay per section of each delay line and the number of line sections between the input end of the line and the pickoff secondary coil of a given signal circuit for each transducer will determine the total delay of the signal from each transducer. For instance, a received signal from transducer 10 is not delayed at all in line 33 as far as the first pickoff secondary coil 44' is concerned. The corresponding received signal, however, from the next adjacent transducer 9 is delayed by two sections of line 34 before it reaches the next pickoff secondary coil 55' in the signal pickup circuit. The corresponding received signal from the next transducer 8 is delayed by four sections of its line 35 before it reaches the next pickoff secondary coil 66'. In a similar manner, the received signal from the next transducer 7 is delayed by six sections of line 36 before reaching the next pickoff secondary coil 77', while the received signal from the forwardmost transducer 6 is delayed by seven sections of line 37 before it reaches the next pickoff secondary coil 88'.

Thus the signals that are acquired by the pickoff secondary windings 44', 55', 66', 77', 88', connected in series, have each been delayed the correct amount to appear substantially simultaneously in the signal pickup circuit and provide overall reception with maximum intensity of a sound wave approaching in the direction of the arrow A. The signal pickup circuit comprising these pickoff secondary windings is connected in series with a conductor 49 at the first pickoff secondary winding 44', and this conductor is connected at its other end to a commutator segment 53 of a commutator switch 52.

Thus far only that portion of the signal pickup circuit for the direction corresponding to the arrow A has been described which acquires signal energy from transducer units 6, 7, 8, 9 and 10. The complete signal pickup acquires signal energy, by way of similar circuit arrangements affording the same delay-compensation scheme, from transducers 1 to 5, inclusive, also. These latter transducers, considered in the order 5 to 1, inclusive, are connected, respectively, to delay lines 38 to 42, inclusive. For the sound wave arriving in the direction of the arrow A, the forwardmost transducer 5 has the same compensation as the corresponding transducer 6. To this end, the free end of the last pickoff secondary winding 88' of the portion of the signal pickup circuit described above is connected to pickoff secondary winding 98'' of delay line 38, which picks off the received signal from the section of line 38 that corresponds to the section of line 37 from which said pickoff secondary winding 88' acquires its received impulse signal. Following this signal pickup circuit through to completion, the remaining pickoff secondary windings in the circuit are 107'', 116'', 125'', and 134'', in series connection, the last winding 134'' being grounded at its free end. The connection through ground returns to a parallel-resonance circuit 51 and therethrough to the commutator switch 52, thus completing the series signal pickup circuit for all of the transducers 1 to 10, inclusive, which provides reception with maximum intensity of a signal arriving in the direction of the arrow A.

The commutator switch 52 is provided with a contactor 52', which contactor shuold be in contact with the segment 53 of the switch 52 to connect the above-described signal pickup circuit for use. In the position illustrated in the drawing, however, the contactor 52' is in contact with another commutator segment 59 which is connected through a wire 60 to the first pickoff secondary winding 64' of delay line 35. This winding is at the beginning of the delay line 35, and to this delay line transducer 8 is connected via wire 25. Thus, in the signal circuit that is connected to segment 59, the least amount of delay, or compensation, is applied to the signal transducer 8. This complete signal circuit includes, in series connection, the following pickoff secondary windings: 64', 75', 86', 97', 108'', 118'', 127'', 136'', and then on to next succeeding lines (not shown) which would include in successive order the received signal impulses from transducers 21 and 20 which would have successively reduced compensation as in the previous illustration described. In this latter signal circuit, the wave front to which the system responds, during reception, with maximum intensity is that which is approaching and arrives in the direction of the arrow B.

The commutator switch contact 52' would be turned through the angle $\theta$ in moving from commutator segment 53 to segment 59. This angle $\theta$ is also the angle between the two arrows A and B, shown in the drawing as the angle between the wave fronts arriving along the direction of these arrows. Thus, the angle through which the commutator switch is rotated corresponds directly to the angular change in directivity of the transducer array, and the switch 52 can conveniently indicate directly the direction of a received signal, or determine directly the direction of a transmitted signal. By continued movement of the commutator switch contactor 52', the transducer assembly is electrically oriented in directivity without physical movement of the transducers in any way.

The electronic commutator switch tube device of the above-referred-to copending application may advantageously be employed as the switch 52, to provide rapid and smooth commutation and scanning. In such a tube the contactor 52' is an electron beam, and the tube is provided with an accelerating electrode, illustrated schematically in the drawing herein as an electrode 70' provided with an accelerating potential by a battery P. As explained in said copending application, a rotatable coil 69 may be employed to sweep the electron beam from one commutator segment to the next.

The system shown in the drawing can be employed both for transmission and reception since the signal, if impressed upon a signal circuit, will be delayed in the delay lines similarly in transmission as in reception so that energy transmitted by way of the transducers produces a plane wave front at which front the compressional wave energy is all in the same phase.

The system may be employed in any medium. The amount of delay employed to bring the signals from the individual transducers or radiators into the same phase is dependent upon the transmission velocity of the waves being employed in the medium, and upon the particular geometry of the configuration of transducers or radiators.

As will be appreciated, with this invention, scanning may easily be made automatic. For this purpose the receiving and indicating circuit comprises an amplifier 60 and a cathode ray oscilloscope 61, the beam 62 of which may be synchronously rotated by means of a control coil 63, or in any other suitable manner. The control coil 63 may be, for example, rotated synchronously with the beam sweeping coil 69 of commutator switch 52, under control of any convenient device functioning as a synchronizer, for example, a common drive motor or a servo system. The signal appearing across the tuned circuit 51 is amplified by the amplifier 60 and impressed upon the intensity control grid 70 of the cathode ray tube, which may be made positive by the incoming signal to permit the beam to produce an indication on the fluorescent face of the cathode ray tube. The system of the present invention in its preferred form employs a cathode ray oscilloscope, as indicated at 61, with a cathode ray beam which is normally suppressed by the grid 70 except when a signal is received.

While the invention may be emplyed in any type of scanning or search system, and for echo ranging and/or direction finding purposes, the advantages thereof are highly appreciated in echo ranging systems employing the time-of-travel method. In these systems, during each duty cycle the direction of maximum response of the transducer or radiator array may be rotated through the entire 360 degrees of azimuth about the searching station a great number of times, thereby presenting a complete plan position indication for each transmitted energy pulse.

One of the features of the invention that makes a satisfactory presentation possible is the employment of loss-less delay lines. The signals that are acquired or picked off from these lines are voltage signals; substantially no current is drawn from any of the delay lines. The signal circuits are connected in series with the parallel resonant circuit 51 for utilization. This circuit develops a very high impedance in series with the pick-off secondary windings, preventing the flow of any but the minutest currents through the signal circuits. It will be recalled that each delay line is terminated in its characteristic impedance 43, so that all the lines are matched to the source and there are no standing waves. The signal circuits do not disturb this matching, and there results a practically loss-less network, able to present a satisfactorily strong signal to the amplifier 60 at very high scanning rates.

The construction of the lens network is not complex. The delay lines may employ as signal output inductors the primary windings of small and compact prefabricated transformers having on one form the primary and two secondary windings. Such a prefabricated transformer easily provides the type coupling between the delay lines and the signal circuits that is desirable.

The above arrangement of individual delay lines for each transducer unit, with a permanent arrangement of signal pickoff windings coupled with and properly placed along each line, and arranged to provide permanent circuits corresponding, respectively, to definite directions of approach or recession of signals, may be termed a lens network, since the signal pickup circuits coupled to the delay lines cause the array to act on the whole as a lens, to bring signals approaching from a given direction and incident upon the individual transducers or radiators at different times into the same phase or into a "focus" in that signal circuit corresponding to the given direction. The arrangement acts analogously to an optical lens which focuses parallel rays at a point in that the individual signals are brought into a single circuit simultaneously; and, as in the optical case, the process is completely reversible.

It will be noted in the present invention that the transducers are not rotated, but stationary, and that the network of delay lines is electrically oriented by means of the signal circuits, which are all alike. The signal circuits may be designed to avoid secondary lobes both in transmitting and receiving. The wave pattern in this case may be such as to enhance the output or sensitivity of the center units of the array and diminish those at the edges. This is accomplished by having more coupling turns on the end-most pickoff secondary windings, such as 88', 98', 98'', 108', 108'', 118', 118'', etc., than on the other sections of the delay lines not so near the end. In fact, the energy output or input may increase progressively in the direction towards the free end of each line.

It should be borne in mind that the invention can be employed in radar systems, where the signal is acquired or radiated by means of antennae or radiation, as well as in underwater sound systems, where electro-acoustic transducers are employed; that is, the array of tranducers 1 to 21, inclusive, may be, if desired, an array of radio antennae.

Having described my invention, I claim:

1. A system comprising, in combination, a group of wave energy transmitting or receiving elements spaced symmetrically in a fixed array for transmitting or receiving in any desired direction, a lens network having a separate delay line connected to each element of the group, a group of similar signal circuits each coupled with each of the delay lines at fixed selected points for picking off or impressing energy, each signal circuit corresponding respectively to given directivity of the group, and a commutator-type selector switch having a movable contactor and a plurality of commutator segments selectively engageable thereby, each of which segments is connected to one of said signal circuits, for selecting a signal circuit corresponding to the desired directivity.

2. A system comprising, in combination, a group of wave energy transmitting or receiving elements spaced symmetrically in a fixed array for transmitting or receiving in any desired direction, a lens network having individual delay lines connected to each element of the group, a plurality of electrical circuits each fixedly coupled similarly to a selected group of said delay lines for cophasing in each circuit the signal energy from or to said elements corresponding to a predetermined directivity of said array, and an electronic commutator tube having a cathode beam and a plurality of commutator segments, each of which is connected to one of said electrical circuits.

3. A system comprising, in combination, a group of wave energy transmitting or receiving elements spaced symmetrically in a fixed array for transmitting or receiving in any desired direction, a lens network having individual delay lines connected to each element of the group, a plurality of electrical circuits each coupled to a prescribed portion of each one of a selected group of said delay lines for cophasing in each circuit the signal energy from or to said elements corresponding to a predetermined directivity of said array, an electronic commutator tube having a cathode beam and a plurality of commutator segments, each of which is connected to one of said electrical circuits, and means operative during receiving for indicating the direction of the energy so received.

4. A system comprising, in combination, a group of wave energy transmitting or receiving elements spaced symmetrically in a fixed array for transmitting or receiving in any desired direction, a lens network having individual delay lines for retarding the wave applied to or picked up at each element of the group, a plurality of electrical circuits each fixedly coupled to a prescribed portion of each one of a selected group of said delay lines for cophasing signal energy from or to said elements to provide directivity to said array, an electronic commutator tube having a cathode beam and a plurality of commutator segments, each of which is connected to one of said electrical circuits, a cathode ray oscilloscope for indicating the receipt of a wave energy signal and means for synchronizing the rotation of the cathode ray beams in the oscilloscope and commutator tube for indicating the direction of the signal so received.

5. A system comprising, in combination, a group of wave energy transmitting and receiving elements spaced symmetrically in a circle in a fixed array, a plurality of similar delay lines permanently connected one to each of said elements, a plurality of similar signal circuits each fixedly coupled to all of said delay lines at prescribed points of delay corresponding to a particular directivity of said group, a commutator switch having a movable contactor and a plurality of commutator segments selectively engageable thereby, each of which segments is connected to one of said signal circuits, and indicating means for indicating the signal obtained in the switch-connected signal circuit.

6. A system comprising, in combination, a group of wave energy transmitting and receiving elements spaced symmetrically in a circle in a fixed array, a plurality of similar delay lines permanently connected one to each of said elements, a plurality of similar signal circuits each fixedly coupled to all of said delay lines at prescribed points of delay corresponding to a particular directivity of said group, an electronic commutator tube having a cathode beam serving as a connecting link successively to each of said signal circuits, and indicating means for indicating the directivity of the signal obtained in the connected signal circuit.

7. A system comprising, in combination, a group of wave energy receiving elements spaced symmetrically in a circle in a fixed array, a plurality of similar delay lines permanently connected one to each of said elements, a plurality of similar signal circuits each fixedly coupled to all of said delay lines at prescribed points of delay corresponding to a particular directivity of said group, an electronic commutator tube having a cathode beam serving as a connecting link successively to each of said signal circuits, a cathode ray oscilloscope having a cathode beam, a grid control therefor, and means for rotating the beam about the oscilloscope screen, means connecting the commutator tube to said control grid for providing an indication on the oscilloscope by control of the beam thereof, and means synchronously controlling the rotation of the two beams for indicating the direction of the signal received.

8. A system comprising, in combination, a group of wave energy transmitting and receiving elements spaced symmetrically in a fixed array for transmitting or receiving in any desired direction, an electrical delay line permanently connected to each element, means including a plurality of similar signal circuits permanently coupled each to each of said delay lines in prescribed sections at various distances along the respective lines for transferring signal energy at such points of coupling for producing or detecting a signal wave corresponding to a particular directivity, the coupling with sections further removed from the input ends of the lines providing progressively a transfer of a greater amount of signal energy.

9. A system comprising, in combination, a group of wave energy transmitting or receiving elements spaced symmetrically in a fixed array for transmitting or receiving in any desired direction, a separate delay line connected at one end to each element and terminated at the other end in its characteristic impedance, a group of similar signal circuits each fixedly magnetically coupled at selected points to each of the delay lines for picking off or impressing wave energy, each signal circuit corresponding to a given direction, and a commutator-type selector switch having a movable contactor and a plurality of commutator segments selectively engageable thereby, each of which segments is connected to one of said signal circuits, for selecting the desired signal circuit corresponding to the desired direction.

10. A system comprising, in combination, a group of wave energy transmitting or receiving elements spaced apart in a fixed array, each adapted for transmitting or receiving in a plurality of directions, an individual electrical delay line connected at one end to each element and terminated at the other end in its characteristic impedance, and a plurality of permanently fixed signal circuits corresponding each to a predetermined directivity of said group, each circuit being permanently coupled to each delay line at the electrical point of delay appropriate for the desired directivity of the group for that circuit, commutator switch means including movable contactor means and a plurality of commutator segments selectively engageable thereby, each of which segments is connected to one of said signal circuits, and signal means connected to said contactor means.

11. A system comprising, in combination, a group of wave energy transmitting or receiving elements spaced apart in a fixed array, each adapted for transmitting or receiving in a plurality of directions, an individual electrical delay line connected at one end to each element and terminated at the other end in its characteristic impedance, and a plurality of permanently fixed signal circuits corresponding each to a predetermined directivity of said group, each circuit being permanently coupled to each delay line at the electrical point of delay appropriate for the desired directivity of the group for that circuit, and electrical commutator means having a movable contactor and a plurality of commutator segments selectively engageable thereby, each of which segments is connected to one of said signal circuits, for selecting a desired signal circuit.

12. A system comprising, in combination, a group of wave energy transmitting or receiving elements spaced apart in a fixed array, each adapted for transmitting or receiving in a plurality of directions, an individual electrical delay line connected at one end to each element and terminated at the other end in its characteristic impedance, and a plurality of permanently fixed signal circuits corresponding each to a predetermined directivity of said group, each circuit being permanently coupled to each delay line at the electrical point of delay appropriate for the desired directivity of the group for that circuit, and means providing a substantially infinite impedance in series with each of said signal circuits during use thereof, whereby said delay lines are substantially undisturbed electrically by the opening and closing of signal circuits.

13. A system comprising, in combination, a group of wave energy transmitting or receiving elements spaced apart in a fixed array, each adapted for transmitting or receiving in a plurality of directions, an individual electrical delay line connected at one end to each element and terminated at the other end in its characteristic impedance, and a plurality of permanently fixed signal circuits corresponding each to a predetermined directivity of said group, each circuit being permanently coupled to each delay line at the electrical point of delay appropriate for the desired directivity of the group for that circuit, electrical commutator means having a movable contactor and a plurality of commutator segments selectively engageable thereby, each of which segments is connected to one of said signal circuits, for selecting a desired signal circuit, and means connected in series with said contactor providing a substantially infinite impedance in series with the selected signal circuit, whereby said delay lines are substantially undisturbed electrically during commutation.

14. A system comprising, in combination, a group of wave energy transmitting or receiving elements spaced apart in a fixed array, each adapted for transmitting or receiving in a plurality of directions, an individual electrical delay line connected at one end to each element and terminated at the other end in its characteristic impedance, and a plurality of permanently fixed signal circuits corresponding each to a predetermined directivity of said group, each circuit being permanently coupled to each delay line at the electrical point of delay appropriate for the desired directivity of the group for that circuit, and an electronic commutator tube having a cathode beam and a plurality of commutator segments, each of which is connected to one of said signal circuits.

15. A system comprising, in combination, a plurality of wave energy transducer elements arranged in a fixed array, a plurality of individual networks each permanently intercoupling said elements to provide maximum response to a plane wave arriving at said array in a particular direction, and commutator switch means having a movable contactor and a plurality of commutator segments selectively engageable thereby, each of which segments is connected to one of said networks, whereby to select the network corresponding to a desired direction.

References Cited in the file of this patent

UNITED STATES PATENTS

| | | |
|---|---|---|
| 1,682,712 | Pierce | Aug. 28, 1928 |
| 1,901,342 | Lamson | Mar. 14, 1933 |
| 1,977,974 | Rudolph | Oct. 23, 1934 |
| 1,995,708 | Fischer | Mar. 26, 1935 |
| 2,224,677 | Hanscom | Dec. 10, 1940 |
| 2,406,340 | Batchelder | Aug. 27, 1946 |
| 2,433,332 | Benioff | Dec. 30, 1947 |

FOREIGN PATENTS

| | | |
|---|---|---|
| 546,202 | Great Britain | Dec. 6, 1939 |